United States Patent [19]

Kasahara

[11] Patent Number: 4,499,730
[45] Date of Patent: Feb. 19, 1985

[54] AUTOMOTIVE TANDEM TYPE MASTER CYLINDER

[75] Inventor: Hiroshi Kasahara, Ueda, Japan

[73] Assignee: Nissin Kogyo Kabushiki Kaisha, Ueda, Japan

[21] Appl. No.: 261,267

[22] Filed: May 6, 1981

[30] Foreign Application Priority Data

May 26, 1980 [JP] Japan .................................. 55-69778

[51] Int. Cl.³ .............................................. B60T 11/26
[52] U.S. Cl. ........................................ 60/585; 60/588
[58] Field of Search ...................... 60/547 R, 562, 585, 60/588, 592, 589

[56] References Cited

U.S. PATENT DOCUMENTS

| 2,844,940 | 7/1958 | Huber | 60/588 |
| 3,013,393 | 12/1961 | Erickson | 60/592 |
| 3,545,206 | 12/1970 | Belart | 60/588 |
| 4,004,425 | 1/1977 | Pickering | 60/562 |
| 4,072,012 | 2/1978 | Kawakami | 60/588 |
| 4,133,287 | 1/1979 | Downs | 60/592 |
| 4,166,431 | 9/1979 | Pickering | 60/585 |
| 4,168,613 | 9/1979 | Nakagawa | 60/588 |
| 4,191,020 | 3/1980 | Krohn | 60/562 |

FOREIGN PATENT DOCUMENTS

| 2615986 | 10/1976 | Fed. Rep. of Germany | 60/585 |
| 900327 | 7/1962 | United Kingdom | 60/588 |
| 979418 | 1/1965 | United Kingdom | 60/547 |
| 2052656 | 1/1981 | United Kingdom | 60/562 |
| 2067251 | 7/1981 | United Kingdom | 60/592 |

Primary Examiner—Abraham Hershkovitz
Attorney, Agent, or Firm—Posnack, Roberts, Cohen & Spiecens

[57] ABSTRACT

An automotive tandem type master cylinder comprising a cylinder body mounted in a frontwardly upwardly inclined manner for increasing the effective engine room space under the cylinder body, and an oil reservoir disposed at rearward, or lower position on the cylinder body for avoiding an increase in height of the hood. An oil passage is formed in the cylinder body in a rearwardly upwardly inclined manner for eliminating air bubbles in working fluid, and a mounting flange projects at the rear end of the cylinder body perpendicularly to the cylinder axis, whereby the cylinder body can be made easily and be shortened in its overall length.

6 Claims, 4 Drawing Figures

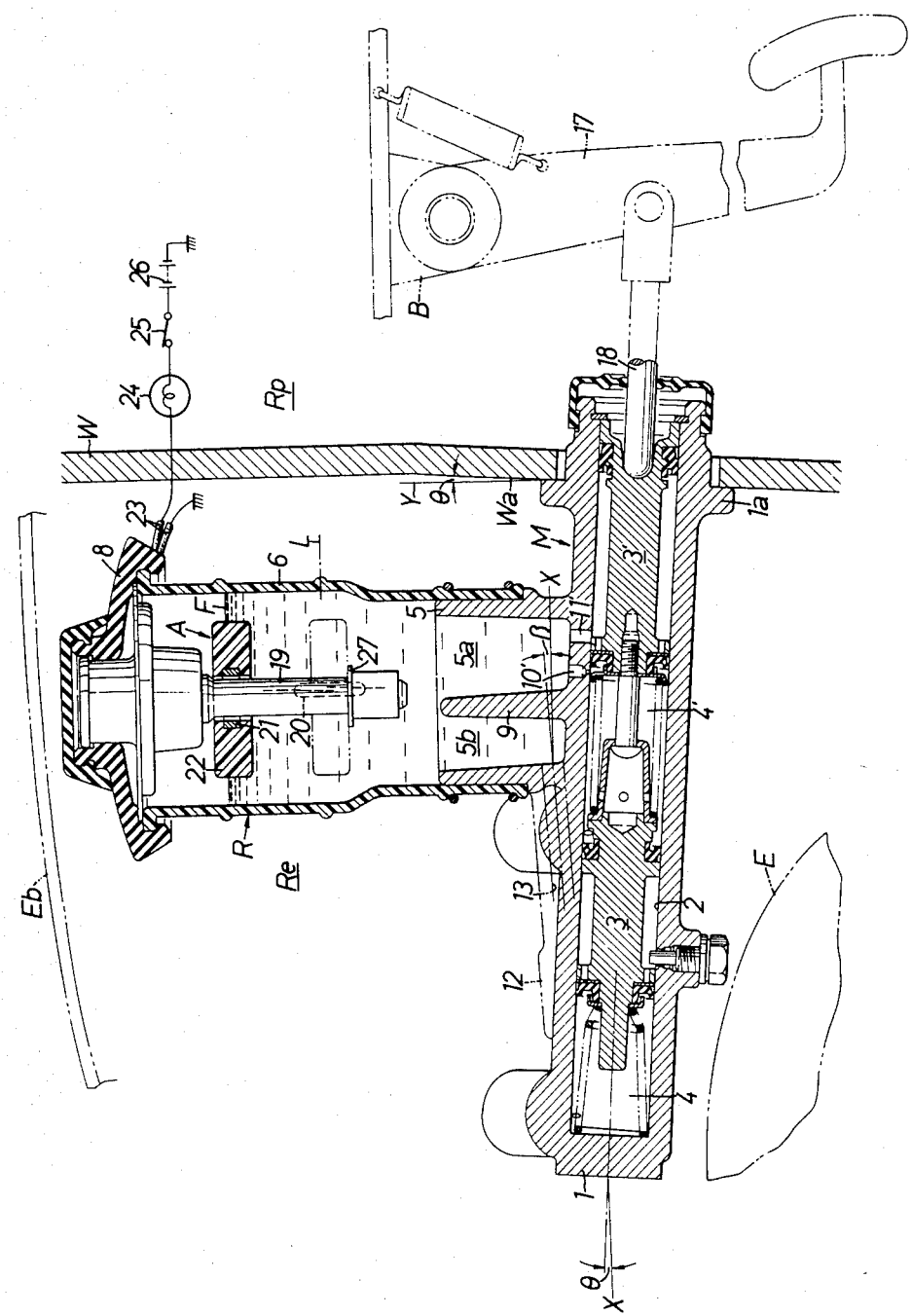

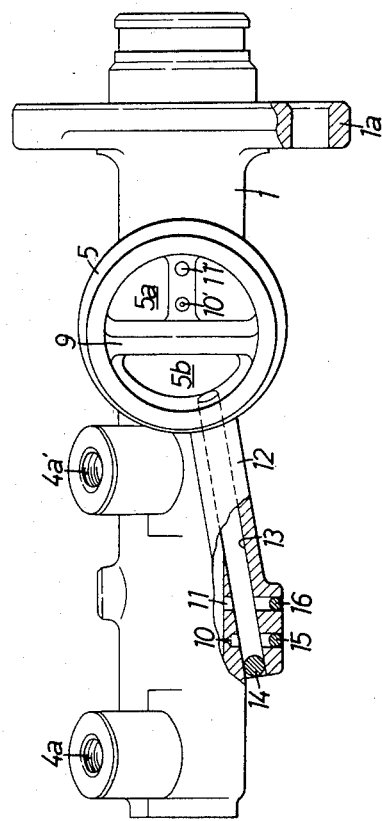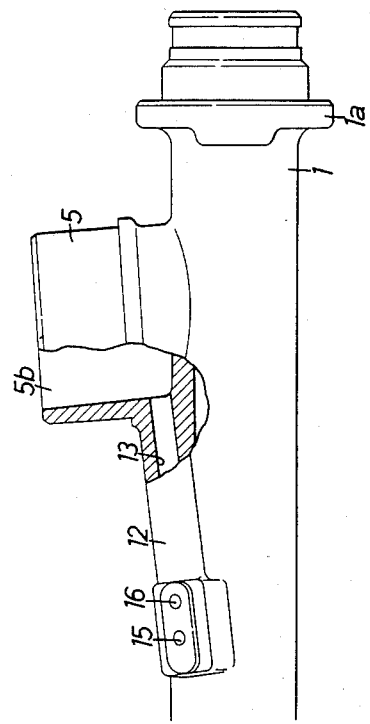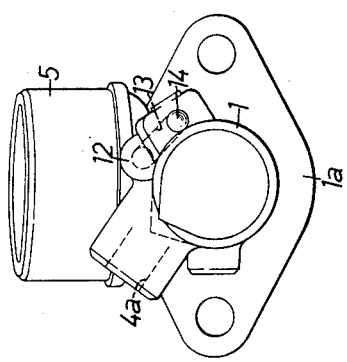

AUTOMOTIVE TANDEM TYPE MASTER CYLINDER

BACKGROUND OF THE INVENTION

This invention relates to automotive tandem type master cylinder devices mainly used in dual type hydraulic brake systems and, more particularly, to improvements in those of the type having an oil reservoir mounted on top of a cylinder body.

Conventionally, when a master cylinder of the above type having a very long axial length is mounted on a front wall of an automobile compartment, the space for mounting an engine and its attachments tends to be reduced. When the mounting position of the master cylinder is shifted upwards for increasing the space, the hood must be raised for avoiding interference of the oil reservoir of the master cylinder.

SUMMARY OF THE INVENTION

The present invention has been proposed to overcome the difficulties encountered in the prior art as described above and has for its primary object the provision of a new and improved automotive tandem type master cylinder device of the type described which enables the effective engine space to be increased as much as possible with the hood height unchanged.

The above and other objects, features and advantages of the present invention will become apparent from the following description when taken in conjunction with the accompanying drawings, which illustrate a presently preferred embodiment of the invention.

BRIEF DESCRIPTION OF THE DRAWINGS

In the drawings:

FIG. 1 is a general longitudinal cross-sectional view in side elevation illustrating a preferred form of tandem type master cylinder device installed in an automobile embodying the present invention;

FIG. 2 is a partially sectional plan view of the cylinder body of the device as shown in FIG. 1;

FIG. 3 is a partially sectional side view showing the construction of FIG. 2; and FIG. 4 is a front view showing the construction of FIG. 2.

DESCRIPTION OF THE PREFERRED EMBODIMENT

An embodiment of the present invention will be explained with reference to the drawings. In FIG. 1, reference charactor W denotes a front wall of an automobile compartment $R_p$ partitioning the compartment $R_p$ and an engine compartment or room $R_e$ provided in front of the compartment $R_p$, and a cylinder body 1 of a tandem type master cylinder M is mounted on the front surface of the front wall W in a forwardly upwardly inclined manner at a prescribed angle $\theta$ to a horizontal X. Due to the inclined mounting of the cylinder body 1, the space under the cylinder body is increased and an engine and its attachments E can be easily installed therein. In addition, reference character $E_b$ seen in this drawing designates a hood of the engine room $R_e$.

As is shown in FIG. 1, a master cylinder mounting surface $W_a$ in the compartment front wall W is upwardly inclined at a prescribed angle $\theta$ to a vertical line Y for inclining the cylinder body 1 so that a mounting flange 1a at the end of the cylinder body 1 can be formed at a right angle to the axis of the cylinder body 1. Accordingly, the cylinder body 1 can be manufactured in a favorable manner and its overall length can be advantageously reduced.

Respectively independent front and rear pressure chambers 4 and 4' are formed in a cylinder bore 2 of the cylinder body 1 by means of a pair of front and rear pistons 3 and 3' slidably fitted in the bore 2 and two circuits of an automotive hydraulic brake system are individually connected to output ports 4a and 4a' of the pressure chambers 4 and 4', respectively.

An oil tank R is mounted on an upper portion of the cylinder body 1. The oil tank R is composed of a cylindrical auxiliary oil reservoir 5 integrally formed on the upper portion of the cylinder body 1 and protruding adjacently to one of the oil pressure chambers disposed at the lower side of the cylinder body 1 i.e. the rear oil pressure chamber 4', and a main oil reservoir 6 made of transparent synthetic resin, the lower end of which is fitted around the outer periphery of the auxiliary oil reservoir 5. The main oil reservoir 6 is larger than the auxiliary oil reservoir 5 in capacity and is provided with a single cap 8 on its top end.

The interior of the auxiliary oil reservoir 5 is divided into a rear first reservoir chamber 5a and a front second reservoir chamber 5b by a partition wall 9 integrally formed with the cylinder body 1 and both the reservoir chambers 5a and 5b are maintained in communication with the main oil reservoir 6. The first reservoir chamber 5a is disposed in the vicinity of the front end of the rear piston 3' and is provided at its bottom wall with a relief port 10' and a supply port 11' for the rear oil pressure chamber 4'.

A hollow longitudinal projection 12 is integrally formed on the outer periphery of the cylinder body 1, extending from the front base of the auxiliary oil reservoir 5 forwardly and somewhat sidewardly of the cylinder body 1. The hollow interior of the longitudinal projection 12 forms an oil passage 13 placing the second reservoir chamber 5b in communication with a relief port 10 and a supply port 11 for the front pressure oil chamber 4, the oil passage 13 being inclined rearwardly and upwardly at a prescribed angle $\beta$ to the horizontal X.

The oil passage 13 is bored from the front end of the longitudinal projection 12 by drilling and a spherical blank plug 14 is driven into the bored inlet. The relief port 10 and the supply port 11 are bored from the top surface of the longitudinal projection 12 by drilling and spherical blank plugs 15 and 16 are also driven into the bored inlets of these ports.

Inside the compartment $R_p$, a brake pedal 17 is pivoted on a fixed pedal bracket B and is connected with the rear piston 3' through a push rod 18.

Description will next be made of the operation of the embodiment described above.

Referring to FIG. 1, when the rear piston 3' and the front piston 3 are pushed forward (leftward in the drawing), in order, by depressing the brake pedal 17 through the push rod 18, the oil pressures are produced in the oil pressure chambers 4' and 4 after the pistons 3' and 3 have passed the relief port 10' and 10 in accordance with the advances of the pistons 3' and 3 and are transmitted through the output ports 4a' and 4a to the corresponding hydraulic braking circuits to operate the respective brakes. When the pistons 3 and 3' are moved backward, the operating fluid is supplied from the first and second reservoir chambers 5a and 5b to the oil pressure chambers 4' and 4 through the supply ports 11' and 11, of which the excessive fluid can be returned from the relief ports 10' and 10 to the first and second reservoir chambers 5a and 5b in the same way as the conventional devices.

The main oil reservoir 6 is provided with a fluid level detecting device A adapted to operate when level F of the working fluid accumulated therein is lowered to the prescribed level L and below. This device A is composed of a switch cylinder 19 mounted on the lower surface of the cap 8 and deeply protruding into the main oil reservoir 6, a magnetically responsive lead switch 20 accommodated in the switch cylinder 19 at a position of the prescribed level L, and an annular float 22 vertically movably fitted around the outer periphery of the switch cylinder 19 and having a magnet 21 embedded therein for closing the lead switch 20. An alarm 24 such as a lamp or the like means, a main switch 25 and a power source 26 are successively connected to the lead switch 20 through a lead wire 23, the alarm 24 being installed in front of a driver's seat in the vehicle and the main switch 25 being adapted to operate in response to opening and closing operations of the vehicular switches. Further, a stopper 27 is provided at the lower end of the switch cylinder 19 for preventing the float 22 from being lowered far below the prescribed level L.

When the vehicle is in operation, namely when the main switch 25 is accordingly closed and a proper quantity of the working fluid is accumulated in the main oil reservoir 6 with its level F higher than the prescribed level L, the lead switch 20 is kept opened freely from magnetic force of the magnet 21 in the float 22 so that the alarm 24 connected to the lead wire 23 is not operated.

However, assuming that oil leakage occurs in the hydraulic pressure circuit of the front oil pressure chamber 4, the working fluid in the first reservoir chamber 5a of the auxiliary oil reservoir 5 is kept intact even when the working fluid in the main oil reservoir 6 and the second reservoir chamber 5b of the auxiliary oil reservoir 5 is emptied so that, during the braking operation, the pressure within the rear oil pressure chamber 4' is increased by the advance of the pistons 3' and 3 to maintain the normal operation of the hydraulic pressure circuit.

Further in this case, when the level F within the main oil reservoir 6 is lowered to the prescribed level L, the float 22 is lowered along the switch cylinder 19 to a position shown by chain dotted lines in FIG. 1 and the magnet 21 approaches and closes the lead switch 20, so that the alarm 24 is immediately energized and operated by the power source 26 to indicate the unusual lowering of the level F to the driver.

Although the level F is further lowered, the float 22 is still kept in a position near the prescribed level L by the stopper 27 and the closed state of the lead switch 20, or the alarming operation can be maintained.

Also in the case where a trouble occurs in the hydraulic pressure circuit of the rear oil pressure chamber 4', the same operation mentioned above are performed, except that the working fluid remains in the second reservoir chamber 5b of the auxiliary oil reservoir 5.

As has been described above, a tandem type master cylinder constructed in accordance with the present invention comprises a cylinder body which is mounted on the front wall of the vehicle compartment in a forwardly and upwardly inclined manner to the horizontal and is provided with front and rear oil pressure chambers formed independently from each other, and an oil tank which includes an auxiliary oil reservoir integrally formed on an upper portion of the cylinder body adjacent to the rear oil pressure chamber and having first and second reservoir chambers separated by a partition wall from each other, and a main oil reservoir formed adjacent the auxiliary oil reservoir in communication with both the reservoir chambers, as a consequence of which the space under the cylinder body is increased to make it easy to dispose an engine or its attachments therein while the oil tank mounted at a relatively low position on the cylinder body may not be the obstacle to the disposition of a hood of an engine room notwithstanding the forward, upward inclination of the cylinder body, which requires no special arrangement for raising the height of the hood.

Further, according to the present invention, relief and supply ports for the rear oil pressure chamber are formed in the bottom wall of the first reservoir chamber and an oil passage communicating with both the relief and supply ports are formed in the side wall of the cylinder body in a rearwardly upwards manner, so that the oil passage having an upwardly inclined relatively long length takes a position toward the second reservoir chamber to guide bubbles produced in the oil within the oil passage due to vibrations or heating toward the second reservoir chamber for elimination of the bubbles. Accordingly, the bubbles can be prevented from being sucked into the oil pressure chambers, thereby ensuring the normal operation of the master cylinder.

Additionally, since the main oil reservoir is provided adjacent the auxiliary oil reservoir in communication with the first and second reservoir chambers, oil supply to both the oil reservoirs can be effected at one time to simplify the oil supply operation, and only one oil level detecting device is sufficient to detect oil levels within the oil reservoirs.

While an embodiment of the present invention has been shown and described, it will be apparent to those skilled in the art that various changes and modifications may be made therein without departing from the spirit of the invention or the scope of the appended claims.

What is claimed is:

1. An automotive tandem type master cylinder comprising a cylinder body provided with mutually independent front and rear oil pressure chambers and mounted on a front wall of a passenger compartment in a forwardly upwardly inclined manner relative to a horizontal plane, an auxiliary oil reservoir having first and second reservoir chambers defined by a partition wall on the opposite sides thereof and integrally formed on an upper portion of said cylinder body adjacent to said rear oil pressure chamber, a relief port and a supply port for said rear oil pressure chamber open at a bottom wall of said first reservoir chamber, an oil passage in a side wall of said cylinder body at a rearwardly upwards inclination to the horizontal plane for connecting a relief port and a supply port for said front oil pressure chamber with said second reservoir chamber, and a main oil reservoir adjacent said auxiliary oil reservoir and communicating with said first and second reservoir chambers, said oil passage being provided in a longitudinal projection integrally formed on the outer periphery of said cylinder body, said longitudinal projection extending from the front base of said auxiliary oil reservoir in a direction forwardly and somewhat sidewardly of said cylinder body, said longitudinal projection being formed at its front face with an opening for said oil passage, said opening being plugged with a blank plug.

2. A device as set forth in claim 1, comprising a mounting flange radially protruded at the rear end of said cylinder body perpendicularly to the axis of said cylinder body and mounted on an upwardly inclined mounting surface of said compartment front wall.

3. A device as set forth in claim 1, wherein said longitudinal projection is formed at its outer periphery with openings for said relief and supply ports for said front oil pressure chamber, said openings being plugged with further blank plugs.

4. A device as set forth in claim 1 wherein said oil passage is straight and extends from said opening at said front face of said longitudinal projection to said second reservoir chamber to open directly thereinto.

5. A device as set forth in claim 4 wherein said oil passage is inclined at an acute angle to the horizontal.

6. A device as set forth in claim 5 wherein said cylinder body is inclined at an acute angle to the horizontal.

* * * * *